United States Patent
Von Paleske

(10) Patent No.: US 6,924,042 B2
(45) Date of Patent: Aug. 2, 2005

(54) MULTI-PLY PLANAR PRODUCT INCLUDING ADHESIVELY BONDED FIBROUS PLIES

(75) Inventor: Peter Von Paleske, Obersülzen (DE)

(73) Assignee: SCA Hygiene Products GmbH, Mannheim (DE)

( * ) Notice: Subject to any disclaimer, the term of this patent is extended or adjusted under 35 U.S.C. 154(b) by 116 days.

(21) Appl. No.: 10/299,904

(22) Filed: Nov. 20, 2002

(65) Prior Publication Data

US 2003/0119397 A1 Jun. 26, 2003

Related U.S. Application Data

(60) Provisional application No. 60/331,605, filed on Nov. 20, 2001.

(51) Int. Cl.[7] .......................... B32B 7/12; B32B 29/00; B32B 5/26
(52) U.S. Cl. ...................... 428/535; 428/154; 428/194; 428/195; 428/511; 428/537.5; 442/149
(58) Field of Search ................................ 428/154, 194, 428/195, 511, 535, 537.5; 442/149

(56) References Cited

U.S. PATENT DOCUMENTS

| | | | |
|---|---|---|---|
| 3,438,374 A | * | 4/1969 | Falb et al. ................... 128/334 |
| 3,619,222 A | | 11/1971 | Werle et al. |
| 3,654,020 A | | 4/1972 | Robinson |
| 3,673,060 A | * | 6/1972 | Murphy et al. ............. 161/126 |
| 3,873,333 A | | 3/1975 | Hijiya et al. |
| 3,994,396 A | | 11/1976 | Reilly et al. |
| 4,095,990 A | | 6/1978 | Konigsberg |
| 4,481,243 A | * | 11/1984 | Allen ......................... 428/154 |
| 4,806,418 A | | 2/1989 | Sigl |
| 4,867,831 A | | 9/1989 | Sigl |
| 5,173,351 A | * | 12/1992 | Ruppel et al. ............. 428/1.74 |
| 5,609,711 A | | 3/1997 | Miller |
| 5,895,545 A | | 4/1999 | Miller |
| 6,379,447 B1 | | 4/2002 | Eden et al. |

FOREIGN PATENT DOCUMENTS

| | | |
|---|---|---|
| DE | 1 809 124 | 7/1970 |
| DE | 42 25 465 | 2/1994 |
| EP | 0 543 764 A1 | 5/1993 |
| EP | 0 708 161 A1 | 4/1996 |
| WO | WO 97/11226 | 3/1997 |

OTHER PUBLICATIONS

EP 708161 A Abstract; Alguier et al, Sep. 1994.*
European Application Serial No. EP 02 025 602 Search Report, dated Feb. 11, 2005.*

* cited by examiner

*Primary Examiner*—Daniel Zirker
(74) *Attorney, Agent, or Firm*—Young & Thompson

(57) ABSTRACT

A planar multi-ply product includes two or more plies of fibrous material, such as a multi-ply tissue product, wherein at least two of the plies are attached to each other with an adhesive agent, which comprises a gelatinous compound, e.g. gelatine. This multi-ply product shows an excellent adhesion between the plies, even if the product carries a lotion.

38 Claims, No Drawings

MULTI-PLY PLANAR PRODUCT INCLUDING ADHESIVELY BONDED FIBROUS PLIES

This application claims the benefit of U.S. Provisional Application No. 60/331,605, filed Nov. 20, 2001.

BACKGROUND OF INVENTION

1. Field of the Invention

The invention relates to a planar product in which at least two fibrous plies are bonded to each other by a special adhesive agent, to the use of the adhesive agent for producing ply bonding of the fibrous plies and to a method of attaching at least two plies with each other. The present invention relates more particularly to tissue products, paper products and nonwoven products in which bonding of the at least two plies is achieved by said adhesive agent.

2. Prior Art

Tissue-making counts as a method of paper making, due to its basic agreement in the methods of production (wet-laying). Tissue making, better, raw tissue production—where involving the single-ply (intermediate) product produced on a special paper-making machine for the production of tissue or tissue paper—is characterized by its extremely low basis weight, usually less than 65, more preferably less than 45 g/m$^2$ and its very high tensile energy absorption index. The tensile energy absorption index materializes from the tensile energy absorption by relating the tensile energy absorption index to the test specimen volume prior to testing (length, width, thickness of the specimen between clamps prior to tensile loading).

The high tensile energy absorption index of a tissue paper results from the outer and/or inner crepe. The former is produced by compression of the web of tissue paper adhering to the drying cylinder by the effect of a crepe knife, the latter by the difference in speed between two fabrics in sequence or, for example, between a sheeting fabric and one or two fabrics.

It is from this high tensile energy absorption index (see DIN EN 12625-4 and DIN EN 12625-5) that the majority of the useful properties usual for tissue and tissue products result. One example is tissue products for hygiene applications (hygiene products, more particularly hygiene paper products) which find application in a wealth of cleaning functions, e.g. in personal grooming and hygiene, in home, industry and institutional areas. They are used to absorb fluids, for decorative purposes, for packaging or even just as supporting material, as is common for example in medical practices or in hospitals. Hygiene paper products with their broad range of applications count today as products for everyday use.

"Tissue papers" or better, raw tissue papers are generally described as the single-ply intermediate products coming from the paper-making machine of lightweight papers, i.e. paper having low basis weight which as a rule is dry-creped on a yankee cylinder with the aid of a crepe knife, whereby the single-ply raw tissue may be built up of one or more layers. "Tissue products" are single or multi-ply finished products produced from raw tissue tailored to final consumer requirements, i.e. tailored in accordance with a requirements profile differing in many respects.

Typical properties of tissue products are their good ability to absorb tensile stress, their draping facility, good textile-like flexibility—properties often termed bulk softness—high surface softness, high specific bulk coupled with a perceptible thickness, an as high as possible liquid absorbency and depending on the application a suitably good wet and dry strength whilst featuring an interesting visual finish of the outer product surface. It is due to these properties that tissue papers are worked into tissue products (tissue paper products) available to final consumers in a wealth of different types and tailored applications, for example as wipes, towels, household and especially kitchen towels, as sanitary products (e.g. toilet papers), paper handkerchiefs, cosmetic tissues (facials) serviettes/napkins or medical garments.

Softness is an important property of tissue products such as handkerchiefs, cosmetic wipes, toilet paper, serviettes/napkins, not to mention hand or kitchen towels, and it describes a characteristic tactile sensation caused by the tissue product upon contact with the skin.

In simplified terms, softness can be subdivided into its main characteristics, surface softness and bulk softness. Surface softness describes the feeling perceived when e.g. one's fingertips move lightly over the surface of the sheet of tissue. Bulk softness is defined as the sensory impression of the resistance to mechanical deformation that is produced by a tissue or tissue product manually deformed by crumpling or folding and/or by compression during the process of deformation.

Where multi-ply tissue products are concerned, care must be taken that the individual plies are bonded to each other by adequate ply bonding, although the ply bonding should not have a negative effect on the softness and absorptivity. Producing ply bonding by mechanical embossing pressure is disclosed for example in GB-C-363699. However, the ply bonding produced thereby is not particularly strong. Apart from this, the necessary high embossing pressure may result in embossing knobs (protrusions) in the finished product which are conspicuous and rough to touch.

This is why ply bonding by chemical methods, i.e. gluing has materialized. Making use of an adhesive in this respect also in combination with mechanical techniques (embossing methods) has found application in producing ply bonding. U.S. Pat. No. 3,673,060 and U.S. Pat. No. 5,173,351 teach, for example, applying an adhesive in the region of the embossing roll directly to the side of the paper web to be later located on the inside of the multi-ply product.

The adhesives employed for a chemically produced ply bonding typically contain components soluble or dispersible in water such as polyvinyl alcohol (see also U.S. Pat. No. 3,673,060), polyvinyl acetate, carboxymethyl cellulose, starch etc.

Conventional adhesives have the disadvantage, however, of losing their adhesiveness when wet and the individual plies become detached from each other when the tissue paper is used when wet. The technical problem involved in this respect is the subject-matter of WO 97/11226. This publication teaches the addition of a water-soluble cationic polymer (glyoxalated polyacrylamide, polyethyleneimine and preferably polyamide epichlorohydrine resin) to an adhesive on the basis of conventional adhesive components (starch, polyvinyl alcohol) to enhance the bonding capacity of the adhesive when wet.

The technique described therein for improving the ply bonding in multi-ply paper, more particularly in tissue products, does not always result in satisfactory ply bonding when dry and/or wet.

Problems associated with ply bonding when dry and/or wet may also be encountered in other planar products having a plurality of fibrous plies (more particularly cellulose fibrous plies) such as non-woven or textile plies.

A further problem arises if two or more plies of a multi-ply product shall be attached to each other and if these plies comprise lotions or other components which were added e.g. to improve the softness of the multi-ply products and which might inhibit or prevent the ply-attachment. Lotions often times comprise compounds which will prevent a suitable ply-attachment.

Therefore, there is a need to provide an adhesive agent which is capable of providing a suitable ply attachment between two plies of a product, especially between two plies of a product which comprises lotion or other ingredients which can inhibit a conventional ply-attachment. Another problem arising when conventional adhesive agents are employed is their non-compatibility with the present demands on easy and quick degradation in landfills. Therefore, there is also a need for adhesive agents for use in multi-ply products, which are oftentimes disposable products, which are easily degradable in landfills and which do not strain or pollute the environment.

SUMMARY OF THE INVENTION

The object of the present invention is thus to provide novel multi-ply planar products, especially tissue products, paper products and non-woven products, which include at least two fibrous plies which excel by their ply bonding when dry and/or wet and/or lotioned.

It is a further object, according to the present invention to provide an adhesive agent which is usable to provide the above products.

Finally, it is an object of the invention to provide a method whereby at least two plies of fibrous material can be attached to each other.

DESCRIPTION OF THE INVENTION

The aforementioned object is achieved by a planar multi-ply product comprising two or more plies of fibrous material wherein at least two of the plies are attached to each other with an adhesive agent, wherein the adhesive agent comprises a gelatinous compound.

The adhesive agent as employed in accordance with the invention is characterized by containing or comprising a gelatinous compound.

Preferably, said adhesive agent comprises between 10 and 100% by weight, preferably 20–90% by weight, more preferably 30 to 80% by weight, most preferably 100% by weight of said gelatinous compound. If a hygroscopic substance is also present, a preferred range can also be 10 to 20% by weight.

The term "Gelatinous compound" in the present context encompasses compounds which are easily deformable yet form-stable. The compounds consist of long or heavily branched parts. Suitable examples for such compounds, according to the present invention, are gelatine, montmorillonite, bentonite, pectins, e.g. highly esterified pectins, phycocolloids, e.g. agar agar, alginate, carrageen, phyllophorane, furellaran, furcellaran, and/or silica gel. An example for a highly esterified pectin is Pectin Classic AS 507® or AS 509®.

The gelatinous compound in the meaning of the present invention can be swollen with a suitable swelling agent and will still maintain its form stability.

Gelatine is a particularly preferred compound according to the present invention. Gelatine is a polypeptide with a molecular mass of approximately 15,000 to more than 250,000 g/mol which is obtained essentially by acidic or alkaline hydrolysis of collagen as comprised in bones of animals. Gelatine comprises, apart from tryptophane, all essential amino acids and is often times used as a component of food. Quite clearly, gelatine is a compound which is not only obtained from a natural source but which is also completely non-dangerous or harmless to animals or human beings. The inclusion of the gelatinous compound, according to the present invention, especially gelatine, is additionally harmless for the environment and will not lead to any strain or pollution on the environmental system.

The gel-forming capacity of gelatine is determined by the Bloom value determination. This is a measurement of the stiffness of a standardized gel under specified conditions. In the present invention, gelatine with a high Bloom value, preferably higher than 150, most preferably in the range of 200–280 is preferred. Gelatine with a high Bloom value is preferred as it has a higher melting as well as a higher gel forming temperature. Additionally, gelatine with a high Bloom value provides for more rapid gel forming and adhesion in the end product. The Bloom value was determined in accordance with "Official Methods of Analysis", publ. by "The Association of Official Analytical Chemists", 1984, $14^{th}$ ed., chap.23.007.

The amino acid composition of gelatine is essentially the same as that of the collagen from which it is derived. In water, especially in heated water, gelatine will primarily swell and will then form a viscous solution which will form a gallert-like gel at a gelatine concentration of 1 weight % to 40 weight % below approximately 40–50° C.

In a further preferred embodiment, the multi-ply product according to the present invention comprises the gelatinous compound as a mixture of 20% by weight gel and of 4% by weight hygroscopic compound and 76% by weight water.

In further preferred embodiments, the gelatinous compound is comprised in the form of micro-sponges and/or micro-capsules. Said micro-sponges are sponge-like structures of the gelatinous compound per se, especially gelatine, while micro-capsules are capsule-like structures of the gelatinous compound per se, especially gelatine. Micro-sponges or micro-capsules are formed under certain conditions, for example, by gelatine.

In a preferred embodiment, according to the present invention, the adhesive agent can additionally comprise a swelling agent. Said swelling agent is preferably water. Water is a good swelling agent for gelatinous compounds, especially gelatine, and is additionally cheap and not harmful to the environment. The gelatinous compound, according to the present invention, will form a coherent substance in the swelling agent, i.e. the gelatinous compound of the present invention will form a three-dimensional network in the swelling agent, wherein the parts of the gelatinous compound will be attached to each other at different points of attachment by side or main valences.

Gelatinous compounds swollen in water as swelling agents are called hydrogels. According to a preferred embodiment of the present invention, forms of stable hydrogels are obtained through a mixture of 10 weight % agar agar in 90 weight % water or through a mixture of 20 weight % gelatine in 80 weight % water. The adhesive agent, according to the present invention, can also additionally comprise hygroscopic substances. Said hygroscopic substances are preferably selected from the group consisting of polyhydroxy compounds, preferably low molecular weight polyhydroxy compounds. Particularly preferred hygroscopic compounds according to the present invention are glycole or glycerine.

Said hygroscopic substances are added to the adhesive agent according to the present invention to avoid that the swelling agent will evaporate during possible subsequent storage of the resultant multi-ply product.

The swelling agent, according to the present invention, is preferably added to the adhesive agents in a weight % range of 60–95, preferably 75–85. The hygroscopic substance is preferably added to the adhesive agent in a weight % range of 2–30, preferably 4–20 according to the amount of adhesive agent.

(i) Multi-ply Product

The term "multi-ply product of fibrous material" is understood to be a planar fiber-based substrate. It comprises at least two plies. Its web structure makes it porous and absorptive of liquids such as water. Its basis weight preferably ranges from 10 to 100 g/m$^2$.

Preferably, the web contains as main component (in particular at least 80% by weight, relative to the dry weight of the fibrous web, without adhesive agent or lotion) cellulosic fibers, in particular pulp, although a proportional use of modified pulp fibers (e.g. from 10 to 50 weight %, relative to the total weight of the fibers) or the use of synthetic fibers suitable for web making (e.g. from 10 to 30% by weight, relative to the total weight of the fibers) is covered by the invention.

The "fibrous web" may be a nonwoven or a "tissue paper", the latter being preferred.

The German terms "Vlies" and "Vliesstoffe" are applied to a wide range of products which in terms of their properties are located between the groups paper, paperboard, and cardboard on the one hand, and textile products on the other, and are currently summarized under the term "nonwovens" (see ISO 9092-EN 29092). The invention allows for the application of known processes for producing nonwovens such as what are called air-laid and spun-laid techniques, as well as wet-laid techniques.

Nonwovens may also be called textile-like composite materials, which represent flexible porous fabrics that are not produced by the classic methods of weaving warp and weft or by looping, but by intertwining and/or by cohesive and/or adhesive bonding of fibers which may for example be present in the form of endless fibers or prefabricated fibers of a finite length, as synthetic fibers produced in situ or in the form of staple fibers. The nonwovens according to the invention may thus consist of mixtures of synthetic fibers in the form of staple fibers and pulp.

If the web is made of "tissue", creped or "uncreped" tissue paper obtained through a wet rush transfer is possible, the use of creped tissue paper being preferred. The tissue paper (or the final tissue paper product obtained therefrom) is multi-ply (typically 2 to 6, more preferably 2 to 4 plies). The adhesive agent can be particularly suitable for multi-ply tissues (or tissue products), in particular 4-ply embodiments as used in toilet paper or handkerchiefs.

The tissue paper may be homogeneous or layered, wet-pressed or blow-dried (TAD-dried). The tissue paper includes, but is not limited to, felt-pressed tissue paper, pattern-densified tissue paper, uncompacted tissue paper or compacted tissue paper.

The starting material for the production of the fibrous material is usually a fibrous cellulosic material, in particular pulp.

If, however, linters or cotton is used as raw material for the production of the fibrous material, usually no further pulping steps are needed. Due to the morphological structure, the cellulose already exists in an open state.

The starting pulps used may relate to primary fibrous materials (raw pulps) or to secondary fibrous materials, whereby a secondary fibrous material is defined as a fibrous raw material recovered from a recycling process. The primary fibrous materials may relate both to chemically digested pulp and to mechanical pulp such as thermorefiner mechanical pulp (TMP), chemothermorefiner mechanical pulp (CTMP) or high temperature chemithermomechanical pulp (HTCTMP). Synthetic cellulose-containing fibers can also be used. Preference is nevertheless given to the use of pulp from plant material, particularly wood-forming plants. Fibers of softwood (usually originating from conifers), hardwood (usually originating from deciduous trees) or from cotton linters can be used for example. Fibers from esparto (alfa) grass, bagasse (cereal straw, rice straw, bamboo, hemp), hemp fibers, flax, and other woody and cellulosic fiber sources can also be used as raw materials. The corresponding fiber source is chosen in accordance with the desired properties of the end product in a manner known from the prior art. For example, the fibers present in hardwood, which are shorter than those of softwood, lend the final product a higher stability on account of the higher diameter/length ratio. If softness of the product is to be promoted, which is important e.g. for tissue paper, eucalyptus wood is particularly suitable as a fiber source.

With regard to softness of the products, the use of chemical raw pulps is also preferred, whereby it is possible to use completely bleached, partially bleached or unbleached fibers. The chemical raw pulps suitable according to the invention include inter alia, sulphite pulps and kraft pulps (sulphate process).

Before a raw pulp is used in the tissue making process, it may also be advantageous to allow further delignification to occur in a separate process step or employ a bleaching process to achieve a more extensive removal of lignin after the cooking process and to obtain a completely cooked pulp.

A preferred production process for tissue paper uses:

a) a forming section (for wet-laying a slurry of cellulosic fibrous material, typically pulp) comprising a headbox and wire portion, and b) the drying section (TAD (through air drying) or conventional drying on the yankee cylinder) that also usually includes the crepe process essential for tissues. This is typically followed by c) the monitoring and winding area.

The tissue paper can be formed by placing the fibers, in an oriented or random manner, on one or between two continuously revolving wires of a paper-making machine while simultaneously removing the main quantity of water of dilution until dry-solid contents of usually between 12 and 35% are obtained. It is possible to include additives in the paper furnish to improve the wet-strength or dry-strength or other properties of the finished tissue paper.

Drying the formed primary fibrous web occurs in one or more steps by mechanical and thermal means until a final dry-solids content of usually about 93 to 97% is obtained. In the case of tissue making, this stage is followed by the crepe process which crucially influences the properties of the finished tissue product in conventional processes. The conventional dry crepe process involves creping on a drying cylinder having a diameter of usually 4.5 to 6 m , the so-called yankee cylinder, by means of a crepe doctor with the aforementioned final dry-solids content of the base ("raw tissue") tissue paper (wet creping can be used if lower demands are made of the tissue quality). The creped, finally dry base tissue paper is then available for further processing into the paper product or tissue paper product according to the invention.

Instead of the conventional tissue making process described above, a modified technique can be used in which an improvement in specific volume is achieved by a special kind of drying, within process section b, wherein an improvement in bulk softness of the resulting tissue paper is achieved. This pre-drying process, which exists in a variety of subtypes, is termed the TAD (through air drying) technique. It is characterized by the fact that the "primary" fibrous web (like a nonwoven) that leaves the sheet making stage is pre-dried to a dry-solids content of about 80% before final contact drying on the yankee cylinder by blowing hot air through the fibrous web. The fibrous web is supported by an air-permeable wire or belt and during its transport is guided over the surface of an air-permeable rotating cylinder drum. Structuring the supporting imprinting fabric or belt makes it possible to produce any pattern of compressed and uncompressed zones achieved by deflection of the fibers in the moist state, followed by pre-drying (TAD step) and leading the web through a pressure nip between a pressure roll and the yankee cylinder surface, thereby resulting in an increased mean of specific volumes and consequently leading to an increase in bulk softness without decisively decreasing the strength of the fibrous web.

Another possible influence on softness and strength of base tissue lies in the production of a layering in which the primary fibrous web to be formed is built up by a specially constructed headbox in the form of physically different layers of fibrous material, these layers being jointly supplied as a pulp jet to the forming stage.

The one-ply intermediate products, originating from the paper-making machine and made of lightweight paper usually dry-creped on a yankee cylinder by means of a crepe doctor, are generally described as "tissue paper" or more accurately base tissue paper. The one-ply base tissue may be built up of two or a plurality of layers respectively.

All multi-ply final products made of base tissue and tailored to the end user's needs, i.e. manufactured with a wide variety of requirements in mind, are known as "tissue products".

When processing the fibrous web or base tissue paper into the final tissue product, the following procedural steps are normally used individually or in combination: cutting to size (longitudinally and/or cross cutting), producing a plurality of plies, producing mechanical and/or chemical ply adhesion, volumetric and structural embossing, folding, imprinting, perforating, application of lotions, smoothing, stacking, rolling up.

To produce multi-ply tissue paper products, such as handkerchiefs, toilet paper, towels or kitchen towels, an intermediate step preferably occurs with so-called doubling in which the base tissue in the finished product's desired number of plies is usually gathered on a common multiply master roll.

The processing step from the base tissue that has already been optionally wound up in several plies to the finished tissue product occurs in processing machines which include operations such as repeated smoothing of the tissue, edge embossing, to an extent combined with full area and/or local application of adhesive to produce ply adhesion of the individual plies (base tissue) to be combined together, as well as longitudinal cut, folding, cross cut, placement and bringing together a plurality of individual tissues and their packaging as well as bringing them together to form larger surrounding packaging or bundles. The individual paper-ply webs can also be pre-embossed and then combined in a roll gap according to the foot-to-foot or nested methods.

Embossing can be used for generating ply adhesion in multi-ply tissue papers. In order to ensure that the lotion does not lower the ply adhesion, the embossed regions may be left untreated.

Multi-ply products using the adhesive agent, according to the present invention, are preferably paper products, textile products or nonwoven products. Especially, said products are wiping cloths, sanitary products, paper-tissue products, towels, wet wipes, medical garments, bandages, cleaning tissues, napkins, bed linens or garments. The use in toilet paper having preferably 2 to 4 plies is particularly preferred.

According to the invention, the tissue paper to be treated with the lotion preferably has a basis weight of 10 to 40, more preferably 12 to 20 $g/m^2$ per ply, in particular 13 to 17 $g/m^2$ and a total basis weight (including all plies without lotion) of usually 10 to 80 $g/m^2$.

Preferably, at least one of said plies is embossed. According to the present invention, the adhesive agent can be present on the embossed regions or over the whole of the ply surface. To achieve attachment, the surface of one of both plies can be provided with the adhesive agent according to the present invention. The adhesive agent can also be comprised on the surface of the plies in a patterned manner. Such pattern can be a regular pinpoint pattern or can be a pattern where only the outer regions, optionally together with a center region of the surface of the ply is provided with the adhesive agent. Furthermore, a pattern may be used wherein only two edges or alternatively four edges of the surface of the plies is provided with said adhesive agent. The provision of the adhesive agent can be alternatively along the outer edge of the surface of the plies with no space left between the outermost edges of the plies and the outermost edges of the adhesive agent pattern while in an alternative embodiment a distance between the outermost edge of the surface of the plies and the outermost edge of the pattern is possible. Said distance can be in the range of 0.5 mm to 3 cm, preferably 0.5 mm to 1 cm. The width of an adhesive agent pattern provided along the edges of the surface of the plies is between about 0.2 mm and 2 cm, preferably 0.2 mm to 1 cm, most preferably 0.2 mm to 0.5 mm.

The provision of patterns as described above and of further patterns is known to a person skilled in the art.

(ii). Lotion

According to a preferred embodiment, according to the present invention, one or more of the plies further comprises a lotion. "Lotion" in the sense of the present invention is meant to encompass all those compositions which will enhance the softness of the multi-ply product. Particularly, "lotion" means aqueous solutions or emulsions or non-aqueous compositions, which contain components that soften the tissue paper and have cosmetic effects on the skin of the user. Further, the treated web feels pleasant to the skin and if necessary is capable of transferring active agents to the skin of the user.

Preferably, the lotion contains at least one oil and one emulsifier, optionally in combination with waxes and/or humectants, such as water-soluble polyhydroxy compounds. One embodiment of the lotion comprises 20 to 90 weight % oil, 1 to 40 weight % emulsifier (either W/O or O/W), optionally 0.5 to 40 weight % wax, optionally 1 to 15 weight % humectant, optionally 6 to 35 weight % water, and optionally suitable amounts of cosmetically active agents. Preferred lotions are also known from DE 199 06 081 A1 and EP A 1 029 977.

A lotioned fibrous web, in particular multi-ply product of the invention is typically obtained by applying the aforementioned lotion composition to a dry fibrous web, in particular tissue web (without lotion). Preferably, the residual water content of the fibrous web, in particular tissue web is no more than 10% by weight.

(ii.1) Preferred Lotion A

By mixing and homogenizing oil, an (O/W) emulsifier or (O/W) emulsifier combination, an oil-in-water (O/W) emulsion is obtained.

A preferred lotion is an O/W emulsion comprising at least one oil, an (O/W) emulsifier or (O/W) emulsifier combination and 6 to 30 weight % of water.

The lotion composition can be a semi-solid or a viscous liquid at room temperature (23° C.).

In the first case, it typically has a viscosity of less than 30,000 mPa•s at 23° C. (measured with a Brookfield-RVF viscosimeter, spindle 5, 10 rpm). Thus, the lotion composition primarily remains on the surface of the fibrous substrate, contributing to surface softness of the product, and to a lesser extent to bulk softness.

In a preferred embodiment, the lotion has a fairly low viscosity in comparison to known semi-solid lotion compositions for tissues. This low viscosity contributes to an excellent penetration behavior and prevents it from remaining on the surface of a fibrous web, in particular a multi-ply tissue product. In multi-ply products, the lotion composition reaches the inner plies, greatly enhancing bulk softness. Such a low viscosity lotion preferably has a viscosity of less than 10,000 mPa•s at 23° C., a value typical of semi-solid lotions (measured with a Brookfield-RVF viscosimeter, spindle 5, 10 rpm; hereinafter viscosity values of the final lotion composition always relate to the measurement with a Brookfield-RVF viscosimeter, spindle 5, 10 rpm). Preferably, it has a viscosity of less than 7,500 mPa•s, more preferably 1,500 to 5,000 mPa•s, in particular, 2,000 to 3,500 mPa•s, measured at 23° C. Further, it is preferred that the viscosity at 30° C. ranges from 800 to 2,500 mPa•s in particular, 1,000 to 2,200 mPa·s. At a temperature of 40° C., preferred viscosity values are 500 to 1,500 mPa•s, in particular, 600 to 1,200 mPa•s. At 50° C., the low viscosity lotion preferably has a viscosity of less than 500, in particular less than 400 mPa•s.

The viscosity of the lotion can be adjusted, as known in the art, by the use of higher or lower amounts of solid components, in particular the consistency regulators mentioned below. Further the homogenization of the lotion (energy influx) may have an impact on the final viscosity. The melting range of the optionally present solid components, as measured according to DSC analysis of the final lotion composition, preferably lies within the temperature range of 25° to 70° C., in particular 30° to 60° C.

This lotion does not require the presence of silicone containing compounds, e.g. silicone oils or quaternary amine compounds in order to attain its softening effect, although their use is not excluded.

Oil Component

The term "oil" is used for water-insoluble, organic, natural and synthetic, cosmetically useful, oils having preferably a liquid consistency at room temperature (23°). The oil component preferably is used in a amount of 20 to 70 weight %, more preferably 30 to 65% by weight, in particular 40 (or 50) to 65% by weight. (Hereinafter, unless stated otherwise, weight % values always relate to the total weight of the lotion composition).

The oil component is suitably selected from among known oils from plant sources, mineral oils, or synthetic oils.

Preferably, the oil component (A) contains at least one oil selected from among the following types:

Glycerides, which are mono-, di- and/or tri ester (fatty acid ester) of glycerol (in particular di- and/or triester). Glycerides can be obtained by chemical synthesis or from natural sources (plant or animal) as known in the art. Preferably the fatty acid component has from 6 to 24, more preferably 6 to 18, in particular 8 to 18 carbon atoms. The fatty acid can be branched or unbranched as well as saturated or unsaturated. According to the invention the use of liquid glycerides from plant sources is preferred, in particular the use of a modified liquid coconut oil (INCI name: cocoglycerides, available under the trade name myritol® 331 from Cognis Deutschland GmbH) which contains as main component a mixture of di- and tri-glycerides based on C8 to C18 fatty acids.

Natural plant oils which also may contain liquid glycerides as main component such as soja oil, peanut oil, olive oil, sunflower oil macadamia nut oil or jojoba oil.

Symmetric or asymmetric, linear or branched dialk(en)ylethers having from 6 to 24 carbon atoms (per alk(en)yl group, preferably having 12 to 24 C atoms as total number of C atoms), such as di-n-octylether (dicaprylylether), di-(2-ethylhexyl)ether, laurylmethylether, octylbutylether or didocecylether, the use of din-octylether (dicaprylylether; viscosity: 2–5 mPaS at 20° C., DGF method described below) being preferred.

Dialk(en)ylcarbonates having preferably at least one C6 to C22 alkyl or alkenyl group (preferred total number of C atoms: not more than 45 including the C atom for the carbonate unit) . The alkyl or alkenyl group can be straight or branched. The alkenyl unit may display more than one double bond. These carbonates can be obtained by transesterification of dimethyl or diethyl carbonate in the presence of C6 to C22 fatty alcohols according to known methods (cf. Chem. Rev. 96, 951 (1996)). Typical examples for dialk(en)ylcarbonates are the (partial) transesterification products of caprone alcohol, capryl alcohol, 2-ethylhexanol, n-decanol, lauryl alcohol, isotridecyl alcohol, myristyl alcohol, cetyl alcohol, palmoleyl alcohol, stearyl alcohol, isostearyl alcohol, oleyl alcohol, elaidyl alcohol, petroselinyl alcohol, linolyl alcohol, linolenyl alcohol, elaeostearyl alcohol, arachidyl alcohol, gadoleyl alcohol, behenyl alcohol, erucyl alcohol and brassidyl alcohol as well as their technical mixture, which are for instance obtained by high pressure hydrogenisation of technical methyl esters on fat or oil basis. Particularly suitable in view of their low viscosity at 20° C. are dihexyl-, dioctyl-, di-(2-ethylhexyl)- or dioleylcarbonat (viscosity of dioctylcarbonate: 7 mPaS at 20° C., DGF method described below). Thus, it is preferred to use either short chain (C6 to C10) alkyl or alkenyl carbonates.

Hydrocarbon-based oils having preferably from 8 to 30, in particular 15 to 20 carbon atoms, such as squalane, squalene, paraffinic oils, isohexadecane, isoeicosane, polydecene or dialkycyclohexane, or mineral oil.

Waxy esters, preferably having the following generic formula (I)

$R^1COO-R^2$   (I)

wherein $R^1CO$ represents a linear or branched acyl residue having 6 to 22 carbon atoms and 0, 1, 2, or 3 double bonds, and $R^2$ represents a linear or branched alkyl or alkenyl residue having 6 to 22 carbon atoms. Preferably, the total number of carbon atoms in the ester is at least 20. Typical examples of waxy esters are myristyl myristate, myristyl palmitate, myristyl stearate, myristyl behenate, myristyl erucate, cetyl myristate, cetyl isostearate, cetyl oleate, cetyl behenate, cetyl erucate, stearyl mystrate, stearyl palmitate, strearyl stearate, stearyl isostearate, stearyl oleate, stearyl behenate, stearyl erucate, isostearyl myristate, isostearyl palmitate, isostearyl stearate, isostearyl isostearate, isostearyl oleate, isostearyl behenate, oleyl myristate, oleyl palmitate, oleyl stearate, oleyl isostearate, oleyl oleate, oleyl behenate, oleyl erucate, behenyl myristate, behenyl palmitate, behenyl isostearate, behenyl oleate, behenyl behenate, behenyl erucate, erucyl myristate, erucyl palmitate, erucyl stearate, erucyl isostearate, erucyl oleate, erucyl behenate and erucyl erucate. Preferably, unsaturated waxy esters, such as oleyl oleate and oleyl erucate are used.

The following esters, which due to similar properties, are also counted among the "waxy esters": esters derived from linear $C_6$–$C_{22}$ fatty acids and branched-chain alcohols, e.g. 2-ethyl hexanol; ester of C18–C38-alkyl hydroxy carboxylic acids and linear or branched $C_6$–$C_{22}$ fatty alcohols; or ester of linear and/or branched fatty acids and polyhydric alcohols (such as propylene glycol, dimerdiol or trimertriol) and/or guerbet alcohols, as well as ester of $C_6$–$C_{22}$ fatty alcohols and/or guerbet alcohols with aromatic carboxylic acids, in particular benzoic acid; ester of $C_2$–$C_{12}$ dicarboxylic acids and linear or branched alcohols having 1 to 22 carbon atoms or polyols having 2 to 10 carbon atoms and 2 to 6 hydroxy groups, in particular dioctyl malate.

Cosmetically useful silicone oils (e.g. those of U.S. Pat No. 4,202,879 and U.S. Pat. No. 5,069,897).

Further, the oil component is preferably selected (depending on chain length or esterification degree as known from the prior art) such that its polarity is not greater than 5, in particular not greater than 4 Debey.

In a further preferred embodiment, the oil component is suitably selected among low viscosity oils, i.e. oils having a viscosity of 1–100 mPa·s, in particular 1–50 mPa·s (e.g. 1–20 mPaS) measured with a Höppler falling sphere viscosimeter at 20° C. (method "Deutsche Gesellschaft für Fettchemie" DGF C-IV 7), in order to achieve the desired penetration behavior on the web, in particular on tissue.

If a deeper penetration of the web by the lotion is desired, it is preferred that the oil component (A) comprise (preferably at least 20% by weight, in particular at least 40% by weight, based on the oil component) at least one
"oil (A')" which is preferably selected from oils having a viscosity lower than 30 mPa·s measured with a Höppler falling sphere viscosimeter at 20° C. (method DGF C-IV 7), and/or from symmetric or asymmetric dialk(en)ylethers having from 6 to 24 C atoms (per alkyl group) and preferably 12 to 24 C atoms in total, or linear or branched dialk(en)ylcarbonates derived from C 6 to 22 fatty alcohols. The viscosity of the oils is preferably less than 20, more preferably less than 15, in particular less than 10 mPa·s measured as above.

In a further preferred embodiment the oil component (A) comprises (preferably at least 20% by weight, in particular at least 40% by weight, based on the oil component) at least one
"oil (A")", preferably having a viscosity greater than oil (A'), in particular greater than 30 mPa·s (preferably at least 40) and not more than 100 mPa·s measured with a Höppler falling sphere viscosimeter at 20° C. (method DGF C-IV 7), and/or being at least one oil (A") selected from waxy esters, glycerides, natural oils and hydrocarbon based oils.

It is preferred to use the oils (A') and (A") in combination, in particular a mixture of (A') dialk(en)ylethers or dialk(en)ylcarbonates and (A"), waxy esters, glycerides, hydrocarbon-based oils or natural oils. The use of dialk(en)ylcarbonates and glycerides in combination is particularly preferred.

If one of these oils is used as part of the oil component (A), its weight proportion preferably is at least 20% by weight, in particular at least 40% by weight based on the total amount of the oil component.

In a particularly preferred embodiment, the oil component (A) comprises 20 to 80% in particular 40 to 60% by weight of a liquid glyceride and 80 to 20% by weight, in particular, 60 to 40% by weight of a liquid dialk(en)ylcarbonate.

O/W Emulsifier

The emulsifier or emulsifier composition (B) is preferably of a non-ionic type and primarily has the function of forming an oil-in-water emulsion. It can also contribute to the softness of tissue paper. It can be suitably selected from known O/W emulsifiers or combination thereof.

The emulsifier (combination) can be relatively polar and may for instance be selected from surfactants having a HLB value of 10 to 18. Such surfactants are known from the prior art and are, for instance, enumerated in Kirk-Othmer, Enclypedia Of Chemical Technology, third edition, 1979, volume 8, page 913. In the case of ethoxylated products, the HLB value can be calculated according to the formula HLB=(100-L):5, where L is the weight proportion of lipophilic groups, e.g. the fatty alkyl of fatty acyl groups.

It is also possible to combine less polar and strongly polar emulsifiers such as the polyol poly(hydroxyesters) (B") and the alkyl(oligo)glycosides (B') described below. Expressed in terms of HLB value, a combination of surfactants having HLB values of 2.5 to 5 and 15 to 18 is also an embodiment of the invention.

The content of the (O/W) emulsifier (combination) is preferably 3 to 40% by weight, more preferably 5 to 30, in particular 7 to 20, e.g. 8 to 15% by weight.

Preferably, a liquid O/W emulsifier is used, although the use of minor amounts of solid emulsifier is possible depending on the desired viscosity of the resulting lotion composition.

Component (B) can be suitably selected from:
ethylenoxide or propylenoxide adducts of fatty alcohols having from 8 to 24 C atoms (in particular 12 to 22 C atoms), (C8–C15 alkyl)-phenol or polyols, containing 2 to 50 mol ethylenoxy and/or 0 to 5 mol propylenoxy units.

Mono- or diesters (or mixtures thereof) derived from glycerol, poly-, oligo- or monosaccharides, sugar alcohols or sugar alcohol anhydrides (such as sorbitan), and linear or branched, saturated or unsaturated fatty acids having preferably 6 to 22 carbon atoms. These esters may also be ethoxylated (→EO units), e.g. polysorbate monolaurate+20 EO or polysorbate monooleate+20 EO. If the ester is to be liquid, the fatty acid can often be selected from short chain saturated fatty acid, e.g. as in sorbitan monolaurate or from fatty acids having at least one unsaturated fatty acid, as in sobitan sesquioleate.

An alkyl(oligo)glycoside (referred to as B') which is a nonionic surfactant wherein at least one hydroxy group (typically the C1 hydroxy of the first glycosyl) of an (oligo)glycoside is linked via at least one ether bond (or ethyleneoxi and/or propyleneoxi units) with an alkyl group-bearing unit (preferably 6 to 28 C atoms in total). The alkyl(oligo) glycoside preferably has the following generic structure (II):

$$R^2O(C_nH_{2n}O)_t(\text{glycosyl})_x \quad \text{(II)}$$

wherein $R^2$ is selected from the group consisting of alkyl, alkylphenyl, hydroxyalkyl, hydroxyalkylphenyl, and mixtures thereof in which the alkyl group contains from 6 to 22 carbon atoms, in particular from 8 to 16 carbon (e.g. 10 to 14 carbon atoms); n is 2 or 3, preferably 2, t is from 0 to about 10, preferably 0; x is at least 1, preferably from 1.1 to 5, more preferably 1.1 to 1.6, in particular 1.1 to 1.4, and "glycosyl" is a monosaccharide. The x value is to be understood as the average content of monosaccharide units (oligomerization degree).

The production of alkyl(oligo)glycoside useful in the present invention is known from the prior art and described, for instance in U.S. Pat. No. 4,011,389, U.S. Pat. No. 3,598,865, U.S. Pat. No. 3,721,633, U.S. Pat. No. 3,772,269, U.S. Pat. No. 3,640,998, U.S. Pat. No. 3,839,318, or U.S. Pat. No. 4,223,129.

To prepare these compounds, the alcohol or alkylpolyethoxy alcohol is typically first formed and then reacted with the (oligo)glycosyl unit to form the (oligo)glycoside (attachment at the 1-position). The glycosyl units can be attached between the C1 position of further glycosyl(s) and the alkyl-group-bearing glycosyl unit's 2-, 3-, 4- and/or 6-position, preferably 6-position.

Preferred starting alcohols $R^2OH$ are primary linear alcohols or primary alcohols having a 2-methyl branch. Preferred alkyl residues $R^2$ are, for instance, 1-octyl, 1-decyl, 1-lauryl, 1-myristyl, 1-cetyl, and 1-stearyl, the use of 1-octyl, 1-decyl, 1-lauryl, and 1-myristyl being particularly preferred.

Alkyl(oligo)glycosides useful in the invention may contain only one specific alkyl residue. Usually, the starting alcohols are produced from natural fats, oils or mineral oils. In this case, the starting alcohols represent mixtures of various alkyl residues.

In four specific (preferred) embodiments alkyl(oligo)glycosides are used, wherein $R^2$ consists essentially of C8 and C10 alkyl groups, C12 and C14 alkyl groups, C8 to C16 alkyl groups, or C12 to C16 alkyl groups.

It is possible to use as sugar residue "(glycosyl)x" any mono- or oligosaccharide. Usually, sugars having 5 or 6 carbon atoms, as well as the corresponding oligosaccharides, are used. Such sugars include, for instance glucose, fructose, galactose, arabinose, ribose, xylose, lyxose, allose, altrose, mannose, gulose, idose, talose and sucrose. It is preferred to use glucose, fructose, galactose, arabinose, sucrose as well as their oligosaccharides, (oligo)glucose being particularly preferred.

In a preferred embodiment "laurylglucoside", a C12–C16 fatty alcohol-glucoside (x=1.4), which can be obtained from Cognis Deutschland GmbH under the tradename Plantacare®, is used.

Combinations thereof.

It is preferred to use a combination of the emulsifier (B') and (B") described below, (B"): a liquid polyol polyester wherein a polyol having at least two hydroxy groups is esterified with at least one carboxylic acid having from 6 to 30 carbon atoms (in particular 16 to 22 C atoms) and having at least one hydroxy group or condensation products of this hydroxy fatty acid. Polyols include monosaccharides, disaccharides, and trisaccharides, sugar alcohols, other sugar derivatives, glycerol, and polyglycerols, e.g. diglycerol, triglycerol, and higher glycerols. Such polyol preferably has from 3 to 12, in particular 3 to 8 hydroxy groups and 2 to 12 carbon atoms (on average, if it is a mixture as in polyglycerols) The polyol preferably is polyglycerol, in particular that having the specific oligomer distribution described in WO 95/34528 (page 5).

The carboxylic acid used in the polyol polyester preferably is a fatty acid having from 6 to 30 carbon atoms (Hereinafter, unless stated otherwise, the term "fatty acid" is not limited to the naturally occurring, even-numbered, saturated or unsaturated long-chain carboxylic acids, but also includes their uneven-numbered homologues or branched derivatives thereof). The fatty acid contains at least one hydroxy group. It can be a mixture of hydroxy fatty acids or a condensation product thereof (poly(hydroxy fatty acids)). The preferred carbon range for the above-mentioned hydroxy fatty acid is from 16 to 22, in particular 16 to 18. A particularly preferred poly(hydroxy fatty acid) is the condensation product of hydroxy stearic acid, in particular 12-hydroxy stearic acid, optionally in admixture with poly (ricinoleic acid), said condensation product having the properties described in WO 95/34528.

Preferred emulsifiers include the polyol poly (hydroxystearates) described in WO 95/34528, in particular polyglycerol poly(hydroxystearates) having the characteristics disclosed in this document, e.g. polyglycerol poly (12-hydroxy stearate), being available from Cognis Deutschland GmbH under the tradename Dehymuls® PGPH.

Preferred amounts of (B') are 1 to 15% by weight, in particular 3 to 8% by weight. Preferred amounts of (B") are 2 to 15% by weight, in particular 3 to 9% by weight.

The weight ratio of B' to B" preferably ranges from 0.2 to 2.0, more preferably from 0.5 to 1.5, in particular from 0.8 to 1.2.

Water

The lotion composition contains 6 to 35% by weight, more preferably 12 to 30% by weight, in particular 15 to 25% by weight of water. The water contributes to a lotion-like pleasant feel to the skin of the user. Water further counteracts the tendency of pure humectants (if present) to withdraw water from the human skin. On the other hand, the water content should not be much higher than 35% by weight, otherwise, the mechanical strength of the treated tissue paper may suffer to an undesired extent. Usually, the aqueous phase of the O/W emulsion contains water as a main component. However, if the water content is closer to the lower limit of the claimed range, it is preferred to add a corresponding amount of water-soluble, aqueous phase-forming components, preferably the humectant, to the lotion composition. Otherwise the discontinuous (oil) phase could be in too close contact, in order to maintain a stable O/W emulsion. In view of the above, the weight proportion of the aqueous phase is preferably more than 20, more preferably at least 22, in particular at least 23, or at least 24 weight %, based on the total weight of the lotion composition.

It is possible to determine the water content in the lotion composition by conducting a water determination according to Karl Fischer. This may also be done with the treated tissue paper. Thus, the entire lotion is extracted with suitable organic solvents (e.g. water-free ethanol), followed by the water determination of the ethanol extract according to Karl Fischer. If necessary, the residual water content of the treated tissue paper is to be subtracted.

In addition to the above, the lotion composition according to the present invention can comprise 1 to 15% by weight and in particular 3 to 8% by weight (water-soluble) humectant. A further optional ingredient can be a co-emulsifier which can be comprised in an amount of up to 15% by weight, preferably 1 to 10% by weight and in particular 3 to 8% by weight, based on the total amount of the lotion composition. Further, optional ingredients of the lotion according to the present invention can be consistency regulators, to adjust the viscosity of the lotion. Further additives might be comprised in an amount of up to 10% by weight in particular 0.1 to 5% by weight and can be preservatives to stabilize the lotion composition, germicidal agents, cosmetic agents, perfumes and cosmetically useful dyes and pigments, e.g. those described in *"Kosmetische Färbemittel,"* (Cosmetic Coloring Agents), published by the *Farbstoffkommission der Deutschen Farbstoff-gemeinschaft*, Verlag Chemie, Weinheim, 1984, p. 81–106.

The above additives may be used separately or in combination.

ii.2. Preferred Lotion B

A further preferred lotion is a viscous W/O emulsion comprising:

A) 20 to 75 weight % of at least one oil
B) 3 to 40 weight % of at least one non-ionic W/O emulsifier,
C) optionally 0.5 to 10 weight % of at least one wax,
D) 1 to 15 weight % of at least one humectant,
E) 6 to 25 weight % of water, wherein the weight % values relate to the total weight of the lotion composition.

The oil component as well as the water and the humectant can be defined as done above with regard to the preferred lotion A. The non-ionic emulsifier can preferably be a polyol polyester of the PGPH type as defined above.

In order to adjust the Theological and/or viscosity properties of the final lotion composition, it may be desirable to incorporate at least one wax in an amount of up to 10% by weight, preferably 0.5 to 10% by weight, in particular, 0.5 to 4% by weight.

The term "wax" (sometimes referred to as "lipophilic" waxes) is used as in the art for natural or synthetic materials which have a kneadable, solid or brittle consistency at room temperature, a fine to granular crystallinity (but are not glass-like), and a transparent to opaque appearance. Useful waxes melt at a temperature above 35° C. without decomposing and slightly above the melting point have a fairly low viscosity.

Useful waxes are listed in DE-A 199 06 081. The use of natural waxes, in particular bees wax is preferred.

As a partial or complete substitute for the wax, fatty alcohols (C12 to C24) may be used which not only behave in a wax-like manner, but also have similar effects on the consistency of the final composition.

Preferably, the lotion composition comprises:

A') 15 to 30 weight % of a liquid dialk(en)ylether having from 12 to 24 carbon atoms,
A") 15 to 30 weight % of a liquid glyceride wherein glycerol is esterified with at least one acid having from 6 to 24 carbon atoms,
B) 15 to 30 weight % of a W/O emulsifier selected from liquid polyol polyester, wherein a polyhydric alcohol having at least two hydroxy groups is esterified with at least one acid having from 6 to 30 carbon atoms,
C) 0.5 to 4 weight % wax,
D) 5 to 10 weight % humectant,
E) 12 to 20 weight % water,
F) optionally 0.5 to 5 weight % of a metal soap
G) optionally up to 15 weight % of at least one co-emulsifier,
H) optionally 0.1 to 5 weight % additives.

wherein glycerides, wax humectant, emulsifier, co-emulsifier and water are defined as above.

In order to further stabilize the W/O emulsion, a metal soap of the following preferred formula may be used (up to 10% by weight), preferably in an amount of 0.5 to 5, in particular 0.5 to 4% by weight:

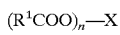

$$(R^1COO)_n\text{—}X$$

wherein $R^1$ represents a linear, saturated or unsaturated acyl residue having 6 to 22 carbon atoms and optionally a hydroxy group, preferably 12 to 18 carbon atoms, X is an alkali metal (e.g. Li), an earth alkali metal (e.g. Ca, Mg), Al or Zn and n is the valence of X. Preferred examples of the metal soap involve zinc, calcium, magnesium or aluminium stearate.

By providing a multi-ply product lotioned with one of the above preferred lotions wherein the plies are attached to each other by the adhesive agent of the present invention, preferably gelatine, a very good adhesive strength is obtained. The resulting product will maintain its adhesive strength over prolonged periods, e.g. during storage of the product. The adhesive agent is also cheap and can be easily handled during manufacture without complicated manufacturing steps and health risks involved for the workers involved in the manufacturing. The adhesive agent of the present invention is also easily biodegradable and environmentally compatible.

iii. Further Embodiments

According to a specifically preferred embodiment, according to the present invention, coloring substances are added to the adhesive agent. Such coloring agents can be selected from the group of compounds which would add a color to the adhesive agent wherein this color can be selected from the group of red, cyan and magenta. The addition of a coloring agent to the adhesive agent of the present invention can be especially advantageous in that a combination of coloring substance and adhesive agent is especially simple and cheap. Furthermore, in those products where coloring of the complete multi-ply or the provision of a pattern, a logo or something similar is supposed to be provided, the coloring substance can be added to the adhesive agent which is applied to the multi-ply product anyway. Thereby, an additional step for providing coloring of the multi-ply product or the provision of the logo and/or pattern for the multi-ply product can be omitted when the coloring substance is automatically added to the multi-ply product via the adhesive agent.

Furthermore, the adhesive agent can additionally comprise a masking substance. Such a masking substance, preferably titanium-oxide, is advantageous if the multi-ply product is a product which in its end use will be confronted with stains which might give the user an uncomfortable feeling. Thereby, by providing the adhesive agent with a masking substance, these stains can at least partially be hidden from the view of the user whereby acceptance of the multi-ply products, according to the present invention, will be considerably enhanced.

By using the adhesive agent, according to the present invention, ply attachment between two or more plies of a multi-ply product is achieved. Without wishing to be bound to this theory, the applicant hypothesizes that the bonding is achieved because the gelatinous compound comprised in the adhesive agent, according to the present invention, will be in a semi-liquefied condition when applied to the plies of the multi-ply product of the present invention and will thereby be capable of at least partly encompassing the fibers of the plies with which it is in contact. When the gelatinous compound, according to the present invention, returns to its form, stable and coherent, non-liquid state, in which it is comprised in the final product, it will thereby bond the fibers of the different plies with each other.

The planar product in accordance with the invention, more particularly as a tissue paper, comprises at least two plies, typically 2 to 6 plies, more particularly 2 to 4 plies. The individual plies will be layered. The term "layer" relates to a change in the chemical and/or physical properties within a ply, e.g. caused by a different fiber composition. Unlike plies, layers as a rule cannot be separated from each other.

The preferred multi-ply product according to the present invention comprises 4 plies wherein at least two of such plies further comprise a lotion within the meaning of the present invention. Preferably said layer lotion comprises at least one oil, O/W emulsifier or O/W emulsifier combination and 6 to 30 weight % of water. The gelatinous compound according to the present preferred embodiment is gelatine and is comprised in said adhesive agent in an amount of 100%.

The present invention also relates to the use of the adhesive agent, as described above, for bonding at least two fibrous plies together and to a multi-ply product obtained in this way. The fibers of the fibrous plies are preferably cellulose based fibers as existing for example, in pulp.

Additionally, the present invention related to a method of attaching at least two plies of fibrous material with each other, said method comprising the steps of:

a) providing a first ply of fibrous material,
b) providing at least a second ply of fibrous material,
c) providing an adhesive agent as defined above between said first and said second fibrous material, and
d) attaching said first and said second ply to each other with said adhesive agent thereby forming a multi-ply fibrous product.

To bond at least two plies to each other in the planar product in accordance with the invention, the adhesive is applied to at least part of the contact surface area of the plies. Where web-shaped products are concerned (e.g. toilet paper) two strip-shaped glued zones may be provided running parallel to each other in the vicinity of the two edges of the web. Where rectangular products are concerned, such as e.g. handkerchiefs, ply bonding may be formed framing the edge zone. Furthermore, the complete surface area may be substantially coated with the adhesive, preferably in combination with an embossed pattern extending over the same surface area. Patterns, as described above, are also considered to be within the scope of the present invention.

For applying the adhesive, the following systems may be used for example:
- roll application by means of a dip roll and transfer roll
- roll application by means of a screen roll, which has a knife, and a transfer roll or an application roll
- spray application directly to the product or indirectly to a roll for fully or partly irregular or regular distribution
- contact application by means of a fixed gluing nip to a moving roll or product web
- extrusion arrangements, e.g. hot gluing arrangements.

In accordance with the invention, it is possible to produce ply bonding solely through chemical means by gluing at least part of the contact surface area. Preferably, however, plies to be bonded are exposed also to mechanical force, more particularly as exerted by embossing techniques. It is particularly preferred to apply the adhesive to the contact points produced by mechanical shaping, more particularly embossing. Suitable embossing methods include foot-to-foot, top-to-ground (nested), border and perforation embossing as well as the various known embossing methods permitting joining the material webs together by contact of protruding and/or recessed areas at the protruding points, the recessed points or their flanks. To bond a plurality of plies to each other it is possible for example to apply the adhesive in the region of the embossing roll directly to one side of the web which in the later multi-ply product is located on the inside as is described, for example, in U.S. Pat. No. 3,673,060 and U.S. Pat. No. 5,173,351. However, it is also possible to allocate the adhesive to the embossing station so that the adhesive is applied directly to the embossing roll where the adhesive is then applied to the side of the material web which in the finished product is located on the outside so that the adhesive migrates through the material web to produce ply bonding on the inside.

The amount of adhesive applied (including the solvent or dispersion agent, more particularly water) is preferably in the range 0.01 to 100 g/m$^2$, more particularly 0.01 to 50 g/m$^2$ (treated surface area), whereby values in the range 0.1 to 20 g/m$^2$ may be more preferred. The amount applied depends, among other things, on the total solids content of the adhesive which is preferably in the range 2 to 20% by weight.

Preferably, the first and second plies are heated prior to, during and/or after the application of the adhesive agent, alternatively, the adhesive agent, per se, can be heated prior to the application to the first and second plies. In a particularly preferred embodiment, after step c) a hot calendaring is carried out. Another possibility is to carry out a hot calibration after step c). Calendaring and calibration are both processes known to a person skilled in the art.

Furthermore, preferably the gelatinous compound, according to the present invention is ground to a fine powder with an average particle size of 0,1–100 μm, preferably 1–50 μm, (in dry condition) and is subsequently treated with a swelling agent before being brought into contact with the first and second plies. Alternatively, the gelatinous compound can be swollen in a suitable swelling agent, subsequently broken up into fine particles with a particle size of 1–1000 μm, preferably 10–500 μm, more preferably 50–200 μm, before being brought into contact with the first and second plies. According to a particularly preferred embodiment of the present invention, the swelling agent is water. A hygroscopic substance can be added to the gelatinous compound. Said hygroscopic substance is selected from a group consisting of polyhydroxy compounds, preferably low molecular weight polyhydroxy compounds, with a preferred MW of below 1000, most preferably glycole or glycerine. In addition, the first and second plies can comprise a lotion with the meaning as described above.

Application of the adhesive agent typically takes place after the web has been dried. If a lotion is used, the lotion will typically be applied after addition of the adhesive agent.

Lotion application typically takes place after the web has been dried. A suitable point in time is, for example, directly after drying the web, shortly before combining the webs to form multiple plies or before forming the multi-ply web into the final tissue product. However, it is preferred first to laminate at least two single-ply webs to a multi-ply web, followed by application of lotion. For tissue paper having two or more plies, the lotion composition may be applied to each ply or only to one or both outer plies. In a preferred production process for lotioned 4-ply (products), two 2-ply webs are each lotioned on only one side, followed by joining together the untreated sides of said 2-ply webs, thereby obtaining a 4-ply product. It can be preferred to apply the lotion composition to at least one, preferably both outer plies of multi-ply (tissue) webs, since then the advantageous penetration behavior of a low viscosity lotion composition can fully be developed by achieving a distribution as even as possible with respect to the z-direction (perpendicular) to the multi-ply web, in particular tissue paper. The individual plies or the multi-ply structure may be patterned either before or after application of the lotion composition. Suitable application techniques include spraying, rotogravure printing or flexo-graphic printing or application by means of rolls having a smooth surface. Preferably, the lotion composition is slightly heated, in particular to a temperature from 30° to 50° C., before it is applied to the web.

It is also possible to apply the lotion first and then to apply the adhesive agent in a subsequent step.

Preferably, the lotion is applied in an amount of 3 to 10 g/m² treated surface, i.e. with the double amount, if both surfaces are lotioned. The weight ratio lotion composition/ web (multi-ply, dry weight) is preferably 5 to 30%, more preferably 10 to 25%.

What is claimed is:

1. Multi-ply tissue paper product comprising:
   two or more plies of tissue paper;
   an adhesive agent bonding at least two of said plies to each other;
   wherein said adhesive agent comprises a gelatinous compound, and at least one of said plies comprises a lotion.
2. The multi-ply product according to claim 1, wherein said adhesive agent comprises 10–100 weight % of said gelatinous compound.
3. The multi-ply product according to claim 1, wherein said adhesive agent additionally comprises a swelling agent.
4. The multi-ply product according to claim 3, wherein said swelling agent is water.
5. The multi-ply product according to claim 1, wherein said adhesive agent additionally comprises hygroscopic substances.
6. The multi-ply product according to claim 5, wherein said hygroscopic substances comprise low molecular weight polyhydroxy compounds.
7. The multi-ply product according to claim 1, wherein said adhesive agent further comprises a coloring substance.
8. The multi-ply product according to claim 7, wherein said coloring substance imparts a color to the adhesive agent, which is selected from the group consisting of red, cyan and magenta.
9. The multi-ply product according to claim 1, wherein said adhesive agent further comprises a masking substance.
10. The multi-ply product according to claim 9, wherein said masking substance is titanium oxide.
11. The multi-ply product according to claim 1, wherein said gelatinous compound is selected from one or more members of the group consisting of gelatin, montmorillonite, bentonite, pectins, phycocolloids, agar, alginate, carrageen, phyllophorane, furellaran, furcellaran and silica gel.
12. The multi-ply product according to claim 11, wherein said gelatinous compound is a mixture comprising 20% by weight of gel, 4% by weight of a hygroscopic compound, and 76% by weight of water.
13. The multi-ply product according to claim 11, wherein said gelatinous compound is gelatin.
14. The multi-ply product according to claim 13, wherein said gelatin has a Bloom value greater than or equal to 150.
15. The multi-ply product according to claim 13, wherein the gelatin has a Bloom value of 200–280.
16. The multi-ply product according to claim 1, wherein said gelatinous compound is in the form of at least one of micro-sponges and micro-capsules.
17. The multi-ply product according to claim 1, wherein said paper product is selected from the group consisting of a wiping cloth, a sanitary product, a towel, a wet wipe, a medical garment, a bandage, a cleaning tissue, a napkin, bed-linen, and a garment.
18. The multi-ply product according to claim 1, wherein at least one of said plies is embossed.
19. The multi-ply product according to claim 1, wherein said adhesive agent is in a pattern between said plies.
20. The multi-ply product according to claim 1, wherein said lotion is an oil-in-water emulsion comprising at least one oil, an oil-in-water emulsifier or oil-in-water emulsifier combination, and 6 to 30 weight % of water.
21. The multi-ply product according to claim 1, wherein said plies further comprise a lotion, said gelatinous compound is gelatin and is present in said adhesive agent in an amount of 100 weight %.
22. The multi-ply product according to claim 1, wherein said adhesive agent comprises 20–90% by weight of said gelatinous compound.
23. The multi-ply product according to claim 1, wherein said adhesive agent comprises 30–80% by weight of said gelatinous compound.
24. The multi-ply product according to claim 1, wherein said adhesive agent comprises 100% by weight of said gelatinous compound.
25. The multi-ply product according to claim 1, wherein said adhesive agent comprises glycerin.
26. A method of bonding at least two plies of tissue paper material to each other, the method comprising the steps of:
   a) providing a first ply of tissue paper;
   b) providing at least a second ply of tissue paper;
   c) applying an adhesive agent comprising a gelatinous compound between said first and said second plies of tissue paper;
   d) bonding said first and said second plies to each other with said adhesive agent, thereby forming a multi-ply tissue paper product; and
   wherein at least one of said first and second plies comprises a lotion.
27. The method according to claim 26, wherein said first and second plies are heated prior to, during and/or after the application of said adhesive agent.
28. The method according to claim 26, wherein after step c) a hot calendaring is carried out.
29. The method according to claim 26, wherein at least one of said first and second plies is embossed; said adhesive agent being applied to raised areas formed by the embossing.
30. The method according to claim 26, wherein said gelatinous compound is, in dry condition, ground to a fine powder with an average particle size of 0.1–100 µm, and is subsequently swelled with a swelling agent before being brought into contact with said first and second plies.
31. The method according to claim 30, wherein the average particle size is 1–50 µm.
32. The method according to claim 30, wherein said swelling agent is water.
33. The method according to claim 30, wherein a hygroscopic substance is added to the gelatinous compound; said hygroscopic substance comprising low molecular weight polyhydroxy compounds.

34. The method according to claim 33, wherein the hygroscopic substance is glycerin.

35. The method according to claim 26, wherein said gelatinous compound is gelatin present in said adhesive agent in an amount of 100 weight %, a step of hot calendaring is carried out after step c).

36. The method according to claim 26, wherein said gelatinous compound is swollen in a suitable swelling agent, subsequently broken up into fine particles with an average particle size of 1–1000 μm, before being brought into contact with said first and second plies.

37. The method according to claim 36, wherein the average particle size 10–500 μm.

38. The method according to claim 36, wherein the average particle is 50–200 μm.

* * * * *